June 24, 1958

V. C. HAMISTER 2,840,458

HEATING FINELY DIVIDED SOLID REACTANTS

Filed March 11, 1955

INVENTOR
VICTOR C. HAMISTER
BY
ATTORNEY

United States Patent Office 2,840,458
Patented June 24, 1958

2,840,458

HEATING FINELY DIVIDED SOLID REACTANTS

Victor C. Hamister, Lakewood, Ohio, assignor to Union Carbide Corporation, a corporation of New York Application March 11, 1955, Serial No. 493,638

5 Claims. (Cl. 23—208)

This invention relates to a process of heating a bed of finely-divided solids at temperatures above about 1500° C. and refers more particularly to processes of conducting chemical reactions at such temperatures by passing an electric current through a charge of reaction mixture to heat the same to the degree necessary for completion of the desired reaction.

Processes of the kind referred to frequently involve the reduction of an oxide. The most common reactions conducted in this way are those resulting in the formation of a carbide such as silicon carbide, titanium carbide, or other refractory carbide. Difficulty is encountered in the manufacture of carbides by this process because of the change of electrical resistance of the charge in the furnace or of the products of the reaction, these changes in electrical resistance making difficult proper control of the reaction and frequently resulting in a product having non-uniform properties. Non-uniformity of product is especially disadvantageous where, as in the case of titanium carbide for example, the product may become the starting material for another process.

Specifically, mixtures of the oxides of silicon, titanium, calcium and like metals with carbon as reducing agent have virtually no electrical conductivity. At temperatures where the oxides are reduced by carbon, the reaction products become electrical conductors, having specific resistances ranging in magnitude from 1 to 1000 ohm-inches. At temperatures above 1000° C. the specific resistances decrease rapidly with increasing temperatures. This decrease in resistance with rise in temperature leads to an unstable electrical condition causing channeling of the electric current in the furnace, thereby leading to localized high temperature paths and ultimately to the production of material not uniform in properties.

It is the principal object of this invention to provide more uniform heat distribution in a furnace charge to be heated by electrical resistance. Another object of the invention is the provision of means for maintaining substantially uniform heat distribution throughout an electrically heated furnace charge until a desired reaction has gone substantially to completion.

These objects are achieved by the invention which comprises the steps of providing conductor bars embedded transversely to the path of current and in a horizontal plane in a reaction mixture in an electrical resistance furnace, such conductor bars being substantially parallel, spaced apart from each other and from the terminal electrodes of the furnace; and filling the spaces therebetween with granular resistance material to provide a path of uniform resistance for the passage of electrical current and thereby to provide a heating element of substantial area within the furnace charge.

Figure 1:
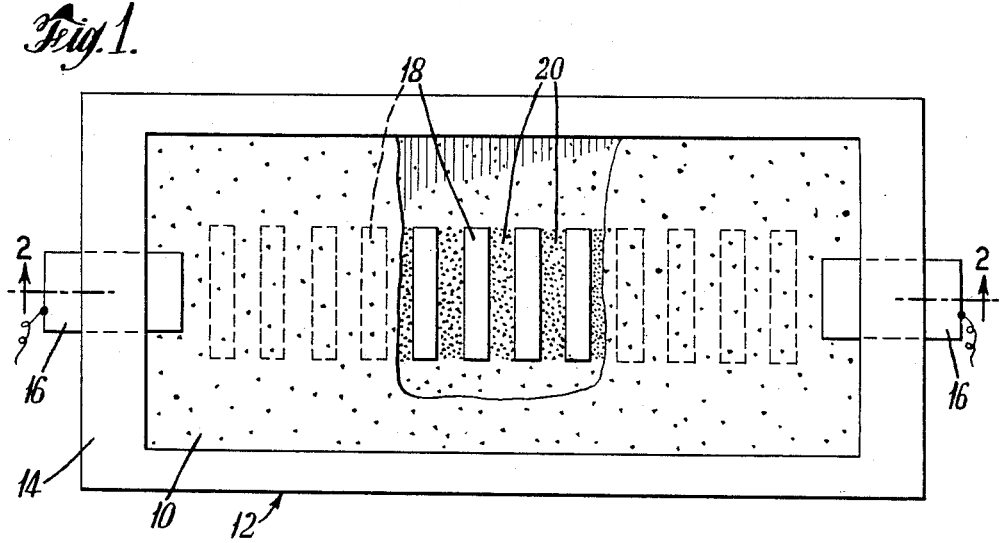
Fig. 1 is a plan view, parts being broken away, of an electrical resistance furnace having a charge therein and embodying the invention.
Figure 2:
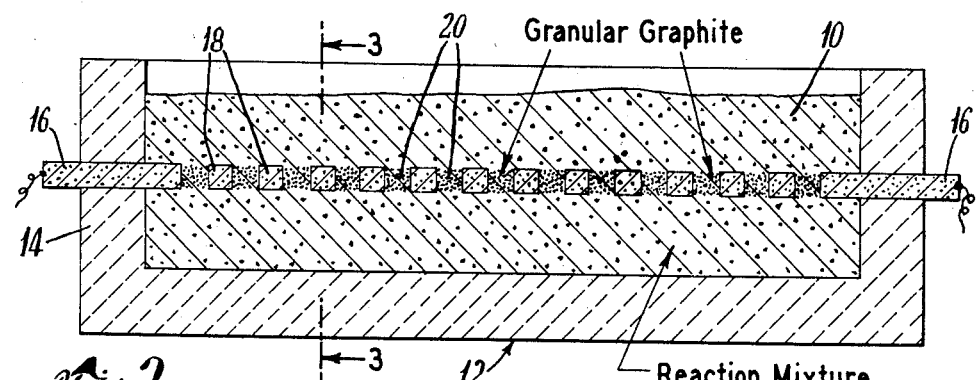
Fig. 2 is a view taken along the line 2—2 of Fig. 1 looking in the direction of the arrows.

In practicing the invention a charge 10 to be heated, for instance a reaction mixture of titanium oxide and carbonaceous reducing agent, is prepared and placed in an electrical resistance furnace 12, for instance of the so-called "Acheson" type having refractory walls 14 and terminal electrodes 16 extending through opposite end walls thereof. The charge 10 is placed in the furnace to bring it up to about the level of the terminal electrodes 16, and a plurality of conductor bars 18 suitably of carbon is placed in the furnace transversely to the intended flow of current, in parallel arrangement, and spaced apart from each other. The end bars are similarly spaced apart from the terminal electrodes of the furnace. In the spaces between the bars there is placed granular resistance material 20 such as crushed carbon or graphite, sufficient of this material being used to bring it level with the tops of the bars 18. The furnace is then filled with reaction mixture to a level such that there is substantially as much of the mixture above the conductor bars 18 as there is below them. An electric current is then passed through the terminal electrodes 16 into the furnace and through the granular resistance material 20 which becomes heated and, in turn, heats the conductor bars 18 to form a heating element within the reaction mixture having a large heating surface.

The following specific examples of its application to the production of carbides will serve to illustrate the practice of the invention.

In a conventional Acheson furnace having terminal electrodes spaced 30 feet apart, carbon bars approximately four inches square in section and 50 inches long were embedded in a reaction mixture four inches apart from each other. The spaces between the carbon bars were filled with granular graphite sized so as to pass through a 10 mesh screen and to remain on a 20 mesh screen (screen openings .065" and .0328" respectively). The reaction mixture was composed of about 64% titanium oxide, 28% petroleum coke, 4.5% sawdust and 3.5% water and a total of about 86,000 pounds was placed in the furnace. When power was applied to the furnace, it was found that it could be controlled at will at temperatures from 1600° C. to 2200° C. The conductor bars and resistor material provided a heating element having a heating area of about 276 square feet and heat was conducted to the surrounding charge at a rate of 3600 to 5500 watts per square foot of heating area. After a total power input of 61,270 kilowatt-hours, power was shut off and the furnace was allowed to cool for one week.

Figure 3:
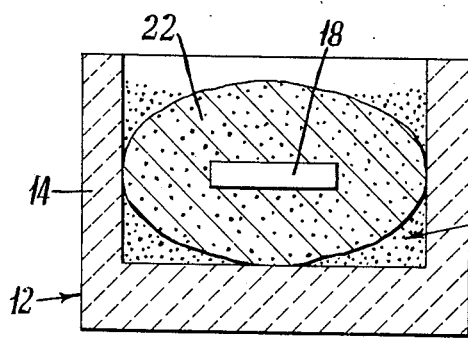
Fig. 3 is a view taken along the line 3—3 of Fig. 2 looking in the direction of the arrows and showing the charge after completion of the reaction.

At the end of the cooling period, loose, unreacted mix was removed leaving a porous core 22 of titanium carbide. This core was elliptical in cross-section as shown in Fig. 3 and uniform in area for the entire distance between the head electrodes of the furnace. The titanium carbide product formed weighed 27,912 pounds. Its properties were substantially uniform throughout.

In another operation a charge containing about 99,000 pounds of a reaction mixture of substantially the same composition used in the previous example was subjected to the application of about 63,000 kilowatt-hours in approximately 48 hours' operating time. Again, an elliptical core of titanium carbide of uniform porosity and properties was produced. The production of titanium carbide amounted to about 30,000 pounds.

In a somewhat smaller furnace than used in the previous examples silicon carbide was produced, the furnace being charged with about 11,000 pounds of a reaction mixture consisting of silica sand and petroleum coke in the ratio of 10 parts by weight of sand to 6 parts by weight of coke. The mixture also contained about 3% each of sawdust and moisture. A number of 2" x 2" x 20" carbon bars were embedded in the charge as in the examples above discussed, the spaces between the bars being filled with granular graphite. A total of 10,610 kilowatt-hours was passed through the charge in about 36 hours. An elliptical core of silicon carbide weighing about 1922 pounds was produced.

An outstanding advantage of the method of the invention noted during its use was the ease with which the temperature could be controlled in the furnace by variation of the electrical input. The uniform heating of the charge attained by the use of the conductor bars embedded therein makes for the production of a product substantially uniform throughout, having desirable porosity. Another advantage of the conductor bars is that they provide support for the upper part of the furnace charge and prevent crushing of the product of reaction in the lower part of the charge. As the reaction mixture shrinks during heating, the conductor bars "float" downwardly so that when the furnace is unloaded, they may be found substantially below the level of the terminal electrodes.

Although the invention has been described with particular reference to its use in the heating of a reaction mixture to accomplish a desired chemical reaction, it is of course applicable to any operation in which a solid material must be heated at temperatures above about 1500° C.

The term "carbon" used herein and in the appended claims is intended to include amorphous carbon and graphite, either natural or artificial.

I claim:

1. In the process of heating finely-divided solids at temperatures above about 1500° C. in which heat is generated by passage of an electric current through a mass of such solids, the improvement which comprises providing, in an electric resistance furnace, a charge to be heated; embedding centrally within said charge, transversely of the flow of current and substantially parallel to each other, a plurality of carbon conductor bars supported on said charge and arranged in a row extending between the terminal electrodes of said furnace and substantially parallel to the bottom of the furnace in a position in which the charge surrounds said row of bars substantially uniformly, said bars being spaced apart from each other and from said terminal electrodes; filling the spaces between said bars and between said bars and said terminal electrodes with granular resistor material; and passing an electric current through said electrodes whereby to heat said resistor material and said conductor bars and thereby to form a floating heating element within said charge.

2. In the process of conducting a chemical reaction between finely-divided solid reactants at temperatures above about 1500° C., in which process the heat of reaction is generated by passage of an electric current through a mixture of such reactants, the improvement which comprises providing, in an electric resistance furnace, a charge to be reacted; embedding centrally within said charge, transversely of the flow of current and substantially parallel to each other, a plurality of carbon conductor bars supported on said charge and arranged in a row extending between the terminal electrodes of said furnace and substantially parallel to the bottom of the furnace in a position in which the charge surrounds said row of bars substantially uniformly, said bars being spaced apart from each other and from said terminal electrodes; filling the spaces between said bars and between said bars and said terminal electrodes with granular resistor material; passing an electric current through said electrodes whereby to heat said resistor material and said conductor bars and thereby to form a floating heating element within said charge; and continuing to pass said current until the desired reaction within said charge has been substantially completed.

3. In the process of conducting chemical reactions involving the reduction of an oxide at temperatures above about 1500° C. in which the heat of reaction is generated by passage of an electric current through a charge consisting of a mixture of such oxide and a reducing agent, the improvement which comprises providing, in an electric resistance furnace, a charge to be reacted, embedding centrally within said charge, transversely of the flow of current and substantially parallel to each other, a plurality of carbon conductor bars supported on said charge and arranged in a row extending between the terminal electrodes of said furnace and substantially parallel to the bottom of the furnace in a position in which the charge surrounds said row of bars substantially uniformly, said bars being spaced apart from each other and from said terminal electrodes; filling the spaces between said bars and between said bars and said terminal electrodes with granular resistor material; passing an electric current through said electrodes whereby to heat said resistor material and said conductor bars and thereby to form a floating heating element within said charge; and continuing to pass said current until the desired reduction within said charge has been substantially completed.

4. In the process of manufacturing refractory metal carbides by the reduction of metal oxide with a carbonaceous reducing agent at temperatures above about 1500° C., in which process the heat of reaction is generated by passage of an electric current through a charge of such oxide and reducing agent, the improvement which comprises providing, in an electric resistance furnace, a charge to be reacted, embedding centrally within said charge, transversely of the flow of current and substantially parallel to each other, a plurality of carbon conductor bars supported on said charge and arranged in a row extending between the terminal electrodes of said furnace and substantially parallel to the bottom of the furnace in a position in which the charge surrounds said row of bars substantially uniformly, said bars being spaced apart from each other and from said terminal electrodes; filling the spaces between said bars and between said bars and said terminal electrodes with granular carbon resistor material; passing an electric current through said electrodes whereby to heat said resistor material and said conductor bars and thereby to form a floating heating element within said charge; and continuing to pass said current until the desired reduction within said charge has been substantially completed.

5. A process for manufacturing titanium carbide which comprises preparing a mixture of finely-divided titanium oxide and carbonaceous material; placing such charge in an electric resistance furnace; embedding centrally within said charge, transversely of the flow of current and substantially parallel to each other, a plurality of carbon conductor bars supported on said charge and arranged in a row extending between the terminal electrodes of said furnace and substantially parallel to the bottom of the furnace in a position in which the charge surrounds said row of bars substantially uniformly, said bars being spaced apart from each other and from said terminal electrodes; filling the spaces between said bars and between said bars and said terminal electrodes with granular carbon resistor material; passing an electric current through said electrodes whereby to heat said resistor material and said conductor bars and thereby to form a floating heating element within said charge; and continuing to pass said current until the desired reaction within said charge has been substantially completed.

References Cited in the file of this patent

UNITED STATES PATENTS

| | | |
|---|---|---|
| 745,122 | Tone | Nov. 24, 1903 |
| 840,044 | Collins | Jan. 1, 1907 |
| 1,521,028 | Little | Dec. 30, 1924 |
| 1,979,052 | Ridgway | Oct. 30, 1934 |
| 2,149,939 | Kinzie et al. | Mar. 7, 1939 |
| 2,237,503 | Ridgway | Apr. 8, 1941 |

FOREIGN PATENTS

| | | |
|---|---|---|
| 21,216 of 1900 | Great Britain | Jan. 13, 1901 |

OTHER REFERENCES

Mantell: "Industrial Carbon," 1946, pages 207–210.